(12) United States Patent
Chuang

(10) Patent No.: US 8,676,023 B2
(45) Date of Patent: Mar. 18, 2014

(54) METHOD OF FABRICATION FOR AN ASYMMETRIC BRAGG COUPLER-BASED POLYMERIC WAVELENGTH FILTER WITH SINGLE-GRATING WAVEGUIDE

(75) Inventor: Wei-Ching Chuang, Taichung (TW)

(73) Assignee: National Formosa University, Yun-Lin Hsien (TW)

( * ) Notice: Subject to any disclaimer, the term of this patent is extended or adjusted under 35 U.S.C. 154(b) by 312 days.

(21) Appl. No.: 13/300,495

(22) Filed: Nov. 18, 2011

(65) Prior Publication Data

US 2013/0129934 A1    May 23, 2013

(51) Int. Cl.
*G02B 6/00* (2006.01)
(52) U.S. Cl.
USPC ............... 385/141; 385/31; 385/37; 385/130; 385/144; 385/145
(58) Field of Classification Search
USPC ............... 385/15, 31, 37, 123, 129, 130, 141, 385/144, 145
See application file for complete search history.

(56) References Cited

U.S. PATENT DOCUMENTS 7,853,102 B2 * 12/2010 Lee et al. ................. 385/37
2010/0084261 A1 * 4/2010 Lee et al. ................. 204/192.26

OTHER PUBLICATIONS

Wei-Ching Chuang et al.,; Fabrication of an asymmetric Bragg coupler-based polymeric filter with a single-grating waveguide; vol. 19, No. 11; Optics Express p. 10776; May 23, 2011.
W. C. Chuang, C. K. Chao, and C. T. Ho,; Fabrication of high-resolution periodical structures on polymer waveguides using a replication process; Opt. Express 15, p. 8649-8659; 2007.
W. C. Chuang, A. C. Lee, C. K. Chao, and C. T. Ho,; Fabrication of optical filters based on polymer asymmetric Bragg couplers; Opt. Express 17, p. 18003-18013; 2009.

\* cited by examiner

*Primary Examiner* — Jennifer Doan
(74) *Attorney, Agent, or Firm* — WPAT, P.C.; Anthony King

(57) ABSTRACT

The present invention discloses a method for fabricating polymeric wavelength filter based on an asymmetric Bragg coupler with single-grating waveguide. The asymmetric waveguide coupler is formed firstly on a negative photo-resist mold. PDMS film is injected into the narrow waveguide of the coupler to act as a protection layer. The gratings pattern is exposed on the alternative waveguide and subsequently transferred to PDMS stamp mold. The PDMS stamp mold is used as a stamp to transfer the gratings pattern of the ABC wavelength filter onto UV cured polymer to form the final ABC filter. Whereby, the fabrication process is reliable and accurate, and can offer great potential for mass production of the ABC filter with single-grating waveguide.

12 Claims, 18 Drawing Sheets

METHOD OF FABRICATION FOR AN ASYMMETRIC BRAGG COUPLER-BASED POLYMERIC WAVELENGTH FILTER WITH SINGLE-GRATING WAVEGUIDE

FIELD OF THE INVENTION

The present invention relates to a method for fabricating asymmetric Bragg coupler-based polymeric wavelength filter with single-grating waveguide, especially to a technique that uses the micro-molding process to simplify the fabrication process for obtaining an ABC filter with good aspect ratio of gratings pattern.

BACKGROUND OF THE INVENTION

As well known, optical add/drop multiplexer (OADM) devices, enabling the flexible insertion (add) or extraction (drop) of a specific wavelength in optical fiber communications, have been indispensable components for wavelength division multiplexing (WDM)-based networks, accommodating large bandwidths for the global spread multimedia communications. These components not only allow the extraction of a wavelength from a transmission loop and the addition of the same wavelength to the network, but also, monitor the signals in transparent networks to identify and locate the possible failures. Numerous different architectures of OADMs, based on different optical devices have been revealed, such as array waveguide gratings, fiber-based, and integrated optics-based devices. Among them, the integrated optics-based devices attract more attention for their compactness, mechanical stability and suitability for mass-production, as well as the inclusion of several functions on a single chip. These include micro-ring resonators, Mach-Zehnder interferometer (MZI) based add/drop filters, grating-assisted co-directional couplers, asymmetric Bragg coupler (ABC) based filters, and Bragg reflector channel waveguide filters. Micro-ring resonators have been the promising devices and used as passive and active components due to their unique properties. However, they generally suffer from either a narrow free spectral range (FSR), or an expensive fabrication equipment, that restrict its application range in WDM networks. The merits and drawbacks of the other devices have been depicted in the present inventor's previous paper (W. C. Chuang, A. C. Lee, C. K. Chao, and C. T. Ho, "Fabrication of optical filters based on polymer asymmetric Bragg couplers," Opt. Express 17, 18003-18013 (2009)). The performance and characteristics of ABC-based filters, based on a single grating in one arm of a non-resonant coupler and operated in a contra-directional mode, have been examined in detail.

In integrated optics or guided wave optics, high quality and inexpensive materials are required for highly-integrated photonic processors. Polymeric materials possess unique optical and mechanical properties such as relatively low refractive index resulting in lower surface-roughness scattering, easily manipulating by conventional or unconventional fabrication technologies, providing excellent platform for integrating numerous materials with different functions, and high flexibility for being bent and attached to non-planar surface. Additionally, they are cost-effective and reliable for mass-production. Polymer surface-relief Bragg grating, which provides a narrow bandwidth, low crosstalk, and flat-top pass band, has become an essential component for various applications in optical communications and optical sensing. For example, J. Kang et al demonstrated a narrow band filter of 0.2 nm bandwidth using polymer surface-relief Bragg grating on an integrated optical waveguide. R. Horvath et al fabricated a cost-effective polymer waveguide sensor chip using polymer surface-relief Bragg grating integrated on polymer film as a light coupler.

In the past, we demonstrated a process to rapidly produce submicron range gratings on a polymeric waveguide for optical filters. A high aspect ratio and vertical sidewalls are obtained, and consistent reproduction of the grating on a UV polymer has been achieved.

Recently, the inventor of the present inventor combined the holographic interferometry, soft lithography, and a simple replication processes for fabricating a polymeric ABC filter. The method includes the following procedures. The grating structure on a polymer was first fabricated using holographic interferometry and the micro-molding processes. An ABC filter was produced by a two-step molding process where the master mold was first formed on negative tone photo-resist and subsequently transferred to a PDMS mold. The PDMS silicon rubber mold was used as a stamp to transfer the waveguide coupler pattern of polymeric ABC filter onto a UV cure epoxy. Narrow bandwidths and deep transmission dips were obtained. However, the device has a disadvantage that the gratings were engraved concurrently on the bottoms of a pair of dissimilar waveguides, embedded into a planar substrate, and therefore an undesired reflection wavelength, denoted by self-reflection Bragg wavelength, caused by the grating of input waveguide was occurred in the input end. In order to overcome the above drawback, we develop a process, incorporating the above technologies with capillary effect and microscopy technologies to fabricate an ABC filter without any self-reflections.

Polymeric ABC filters were constructed using the planar channel waveguide configuration. A pair of parallel channel waveguides with different widths was proximally embedded into a planar substrate. These two waveguides are asynchronous because the effective indices of the two waveguides are quite different. In spite of the large index mismatch between the two waveguides, an efficient power coupling was achieved using the Bragg grating, engraved on the bottom of the either/both waveguides. Due to the close proximity of the two waveguides, engraving the grating on the bottom of the either waveguide is much more difficult than that of the both ones. However, if the gratings are engraved on the bottoms of both waveguides, the maximum self- and cross-reflection power coupling simultaneously occurred in the input and drop ports, respectively. The self-reflection light results in broadening the transmission spectrum of the filters because of the spectral overlapping with the cross-reflection one. In the previous work, we made the two decoupled waveguides quite dissimilar to avoid the spectrum overlapping. In this present invention, we develop a process, comprising of capillary effect and microscopy technologies, to eliminate the self-reflection light by removing the grating of the input waveguide; the schematic diagram of an ABC-based polymeric filter is depicted in FIG. 5. It is noted that there is no grating on the input waveguide. To our best knowledge, it is the first report for ABC structures with a single-grating waveguide on polymeric materials.

SUMMARY OF THE INVENTION

The objective of the present invention is to provide a method to fabricate polymeric waveguide filters based on an asymmetric Bragg coupler with single-grating waveguide. In the present invention, a master mold of an asymmetric waveguide coupler is formed firstly on a negative photo-resist mold, and is followed by injecting a first PDMS film into the narrow waveguide of the coupler to act as a protection layer.

Then gratings pattern was exposed on the alternative waveguide and subsequently transferred to PDMS stamp mold. The PDMS stamp mold is used as a stamp to transfer the gratings pattern of the ABC wavelength filter onto UV cured polymer to form the final ABC filter. The simulation and experiment results demonstrate that the fabrication process of the present invention is reliable and accurate, which may offer great potential for mass production of grating structure on either waveguide of the waveguide couplers of the ABC filter.

DETAILED DESCRIPTION OF THE PREFERRED EMBODIMENT

Figure 1:
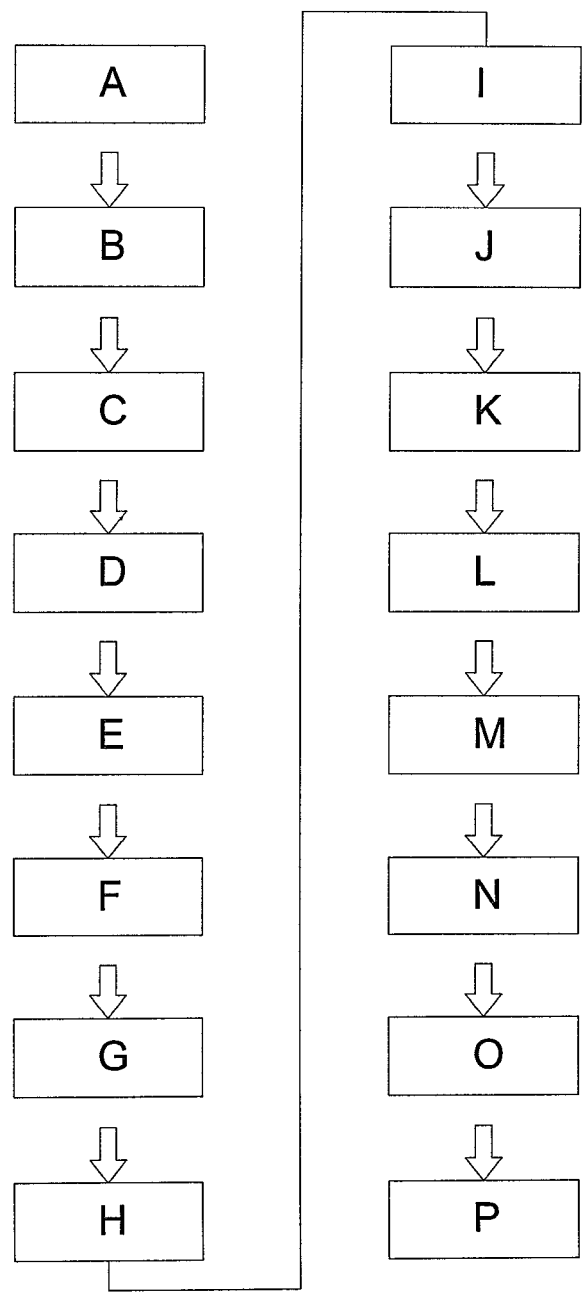
FIG. 1 shows a basic fabrication process in accordance with the present invention.
Figure 2:
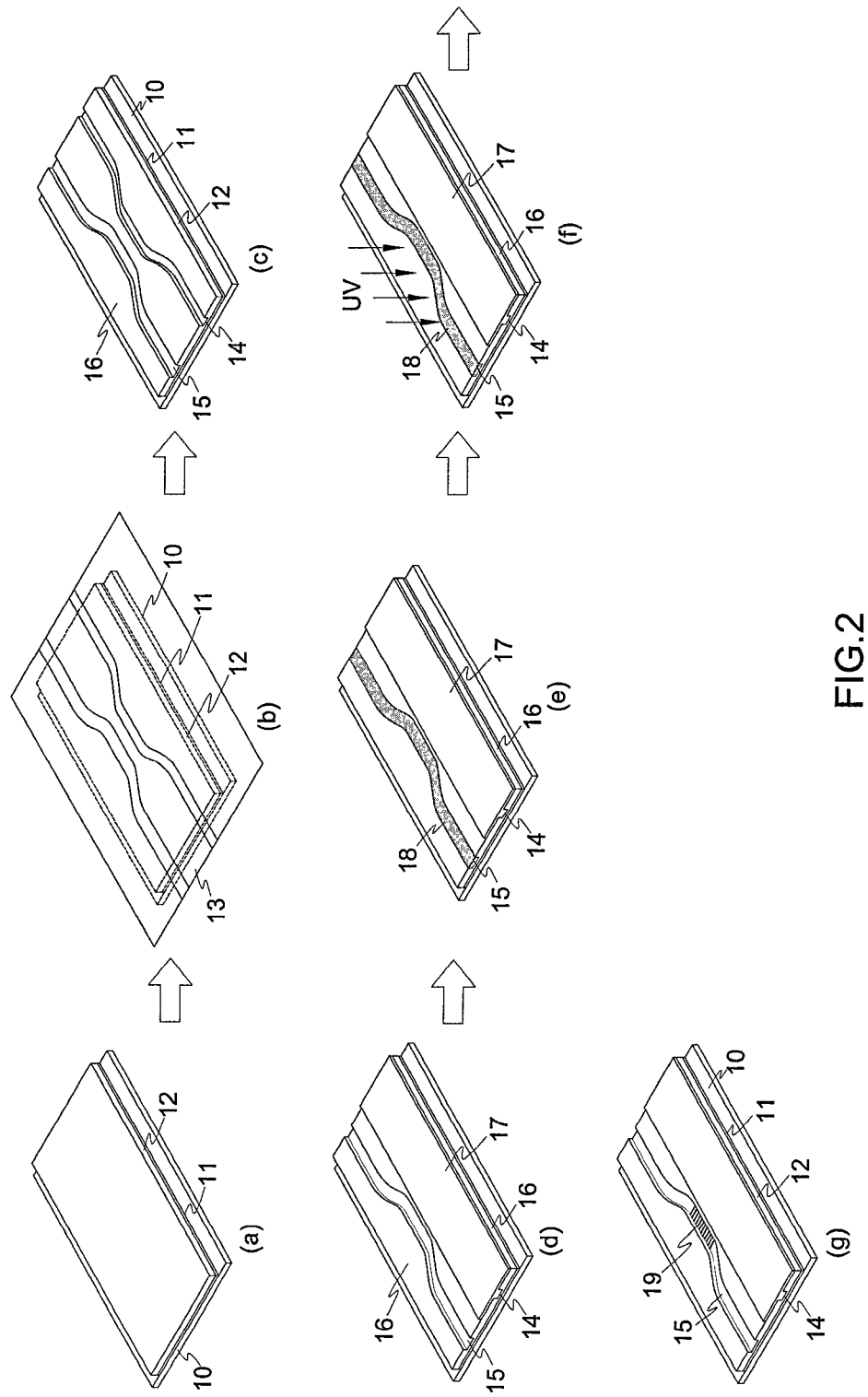
FIG. 2 shows the first section of the fabrication process in accordance with the present invention.
Figure 3:
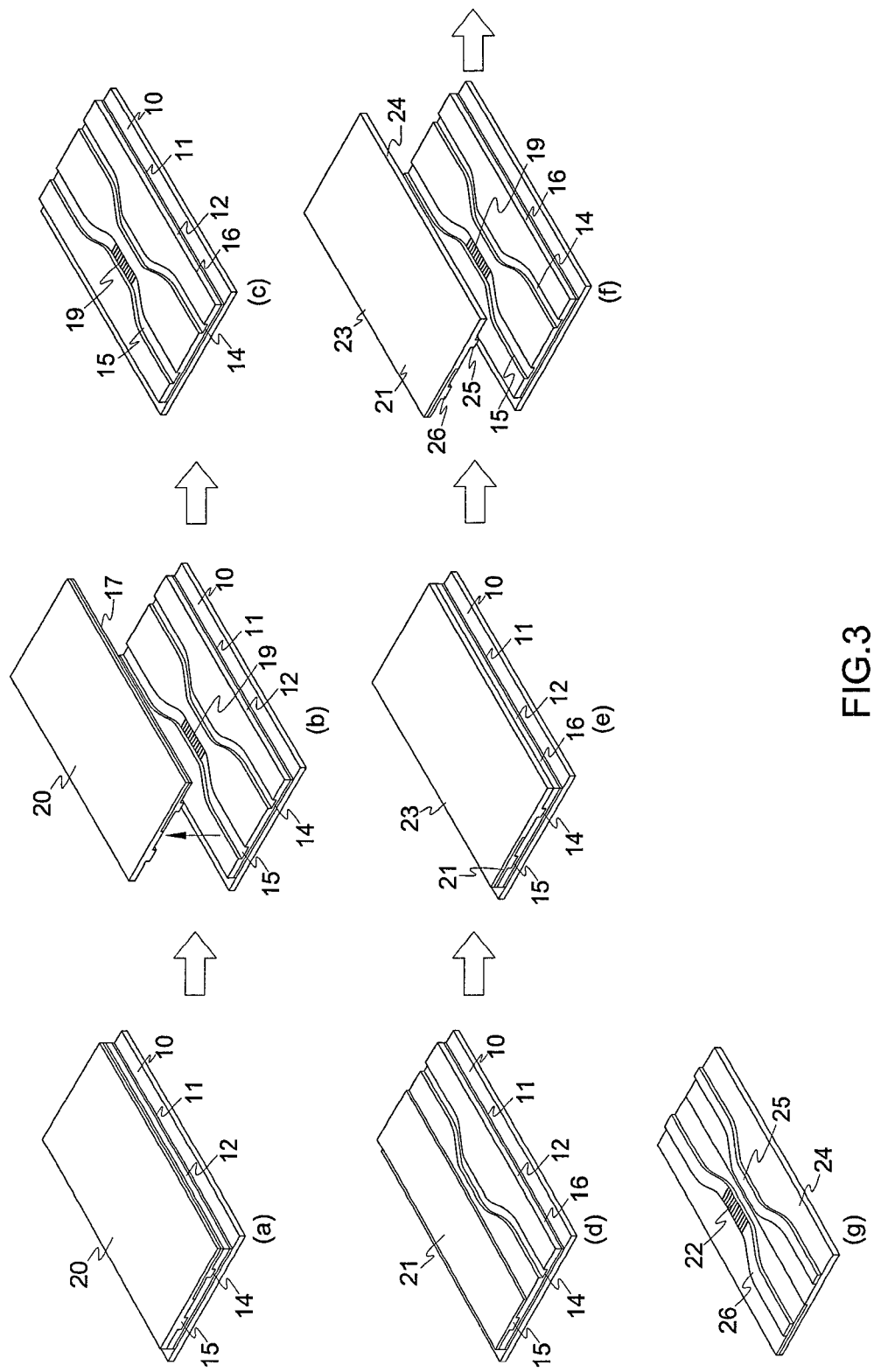
FIG. 3 shows the second section of the fabrication process in accordance with the present invention.
Figure 4:
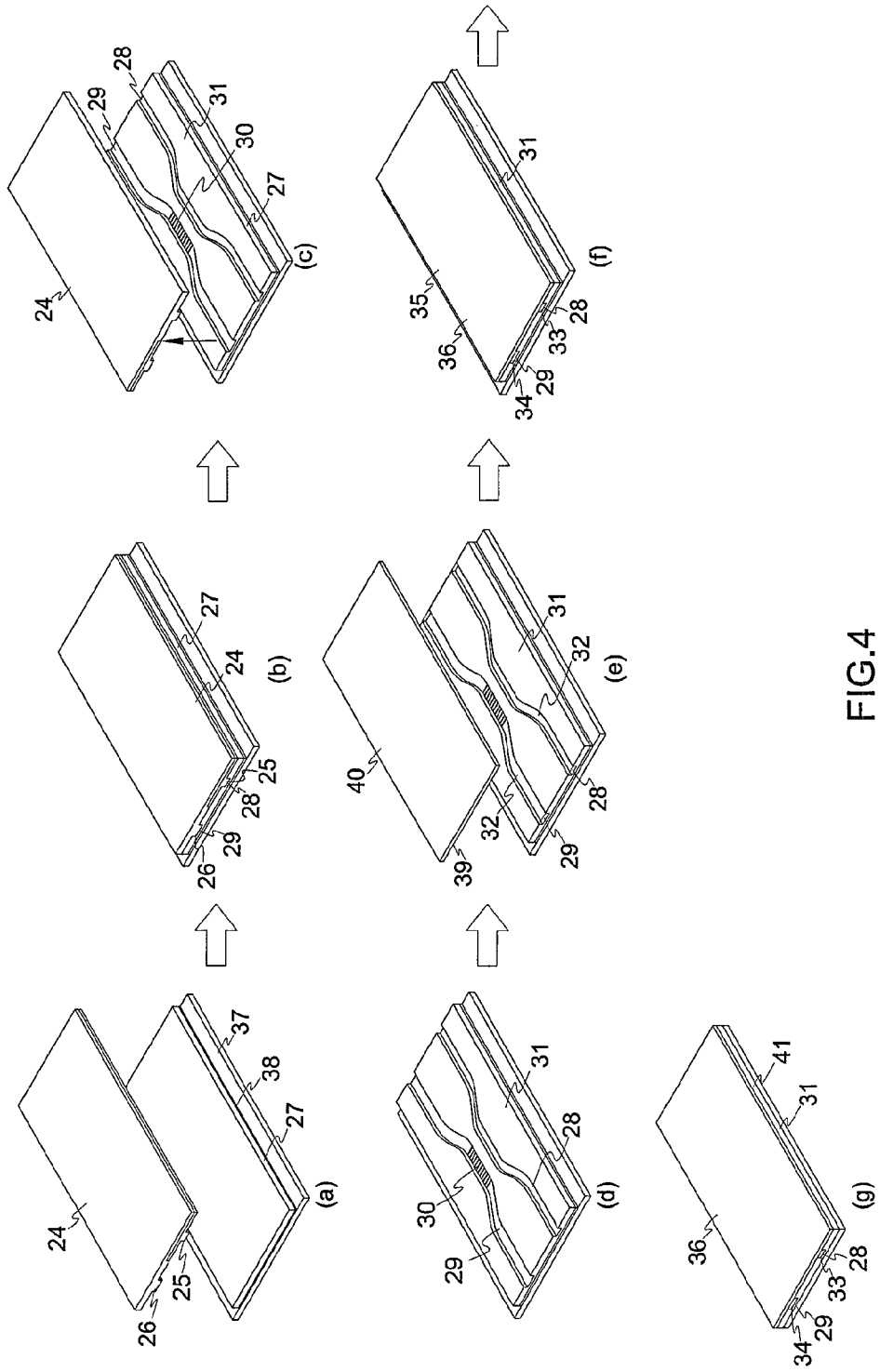
FIG. 4 shows the third section of the fabrication process in accordance with the present invention.

I. The Basic Fabrication Process of the Present Invention

Figure 5:
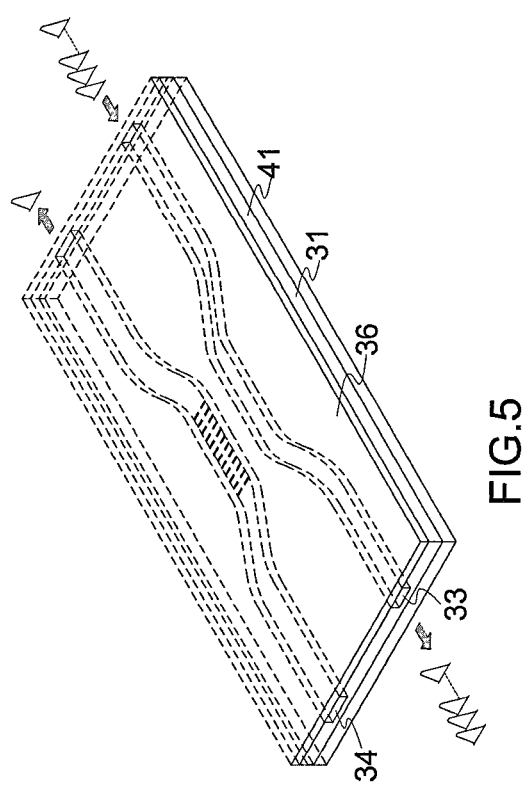
FIG. 5 shows the final filter in accordance with the present invention.

Referring to FIGS. 1 to 5, the basic method for fabricating the polymer wavelength filter of the present invention comprises following steps:

(A) depositing a UV polymer film 11 and a negative photo-resist film 12 on a glass substrate 10 (referring to FIG. 2(a));

(B) the negative photo-resist film 12 being exposed by UV light through a photo mask 13 to obtain a negative photo-resist mold 16 having a first groove 14 and a second groove 15, the widths of the two grooves 14/15 being different from each other (referring to FIGS. 2(b) and 2(c));

(C) depositing a first PDMS film 17 on the half area of the top of the negative photo-resist mold 16 and being filled in the first groove 14 of the negative photo-resist mold 16, and baking the first PDMS film 17 (referring to FIG. 2(d));

(D) depositing specific amount of positive photo-resist 18 in the second groove 15 (referring to FIG. 2(e));

(E) exposing the positive photo-resist 18 by holographical technology to form first gratings 19 on the bottom of the second groove 15 (referring to FIGS. 2(f) and (g));

(F) depositing a second PDMS film 20 on the top of the negative photo-resist mold 16 to cover the first PDMS film 17 and being filled in the second groove 15, and baking the second PDMS film 20 (referring to FIG. 3(a));

(G) removing the second PDMS film 20 and the first PDMS film 17 from the negative photo-resist mold 16 (referring to FIGS. 3(b) and (c));

(H) depositing a third PDMS film 21 on the half area of the top of the negative photo-resist mold 16 and being filled in the second groove 15 of the negative photo-resist mold 16, and baking the third PDMS film 21 so as to have second gratings 22 transferred by the first grating 19 of the negative photo-resist mold 16 (referring to FIG. 3(d));

(I) depositing a fourth PDMS film 23 on the top of the negative photo-resist mold 16 to cover the third PDMS film 21 and being filled in the first groove 14, and baking the fourth PDMS film 23 to adhere with the third MDMS film 21 (referring to FIG. 3(e));

(J) removing the negative photo-resist mold 16 from the fourth PDMS film 23 and the third PDMS film 21, so that the composition of the fourth PDMS film 23 and the third MDMS film 21 being a PDMS stamp mold 24, the PDMS stamp mold 24 having a first protruding strip 25 and a second protruding strip 26 with the shape matching with the first groove 14 and the second groove 15 respectively, and the second protruding strip 26 having the second gratings 22 (referring to FIGS. 3(f) and (g));

(K) depositing the PDMS stamp mold 24 on a first UV polymer film 27, so that the first UV polymer film 27 being formed a third groove 28 and a fourth groove 29 by the first protruding strip 25 and the second protruding strip 26 respectively, and the bottom of the fourth groove 29 being formed third gratings 30 transferred by the second gratings 22 of the PDMS stamp mold 24 (referring to FIGS. 4(a) and (d));

(L) curing the first UV polymer film 27 by exposing UV light;

(M) removing the PDMS stamp mold 24, so that the cured first UV polymer film 27 being a cladding layer 31 of the wavelength filter (referring to FIG. 4(d));

(N) injecting specific amount of second UV polymer 32 into the third groove 28 and the fourth groove 29, and exposing by UV light to form waveguide cores 33/34 of the wavelength filter (referring to FIGS. 4(e) and (f));

(O) depositing a third UV polymer film 35 on the cladding layer 31 to seal the top opening of the third groove 28 and the fourth groove 29 (referring to FIG. 4(e)); and (P) exposing the third UV polymer film 35 by UV light, so that the third UV polymer film 35 being cured as second cladding layer 36 and cross-linking with the first cladding layer 31, and finally obtaining the ABC wavelength filter 41 having the second cladding layer 36, the waveguide cores 33/34 with different width, and the first cladding layer 31 receiving the waveguide cores 33/34 and the gratings 30 pattern (referring to FIGS. 4(f), 4(g) and FIG. 5).

II. The Embodiment of Grating Fabrication Process of the Present Invention

Figure 6:
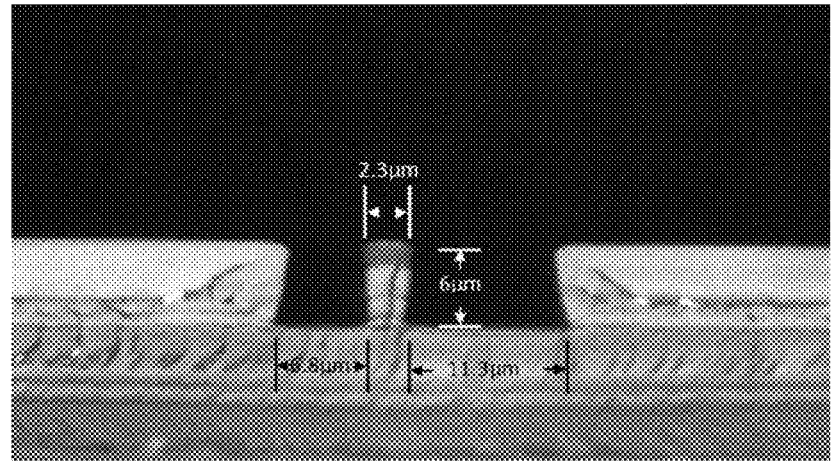
FIG. 6 is an optical-microscope photograph of asymmetric waveguide coupler pattern on the negative photo-resist mold in accordance with the present invention.

A three-step process for rapid prototyping of an intaglio-type asymmetric waveguide coupler structure on a polymer substrate was carried out first. A 700-µm thick glass substrate 10 was first cut into a 5 cm×1 cm rectangle. After the glass substrate 10 cleaning, a UV polymer film (OG 146, Epoxy Technology Inc., USA) was deposited on the glass substrate 10, and then it was coated with 6.0 µm thick negative photo-resist (SU8) spun on at 1000 rpm for 17 seconds (referring to FIG. 2(a)). An asymmetric waveguide coupler pattern was exposed on the negative photo-resist film 12 through polyethylene terephthalate (PET)-based mask 13 using a UV mask aligner (AB-manufacturing, CA) for 9 seconds; this was followed by development in a SU-8 developer (MicroChem Corp., MA) for 45 seconds to obtain a negative photo-resist mold 16 having a first groove 14 and a second groove 15 with different width as waveguide coupler pattern of ABC filter (referring to FIGS. 2(b) and (c)). This produced a master that was subsequently used to produce a polydimethylsiloxane (PDMS) stamp mold 24. This silicone rubber stamp mold 24 was then used as a stamp to transfer the intaglio-type waveguide pattern onto a UV cured polymer (in the embodiment of the present invention, the UV cure polymer is Ormo-comp polymer which is the product of German company "micro resist technology GmbH"). The optical microscope (OM) image shows the end-face of the cross-section of the negative photo-resist mold (referring to FIG. 6), the cross-sectional dimensions are 6.8 µm×6 µm and 11.3 µm×6 µm and the gap is about 2.3 µm.

Figure 7:
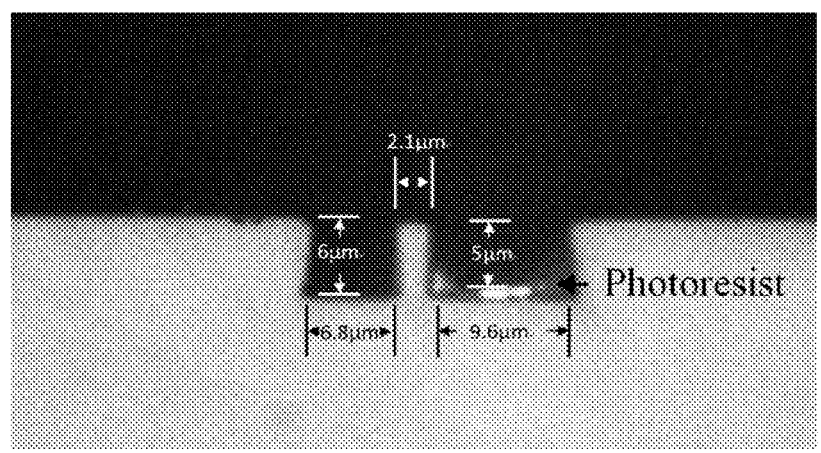
FIG. 7 is an optical-microscope photograph of an asymmetric Bragg coupler mold in accordance with the present invention, the positive photo-resist filled into the wider waveguide groove.

In order to eliminate the self-reflection from the input terminal of the ABC filter, the grating of the waveguide mold was made on either side (drop terminal) of the asymmetric waveguides. A specific amount of pre-cured PDMS with low viscosity was injected into the narrower waveguide groove with capillary effect using a dripping needle, assembled on a micro-positioning stage with resolution of 0.1 µm, under the inspection of a long-working-distance microscope (ZAK microscopes, the focal length of the objective is 13 mm.), so as to form a first PDMS film 17 deposited on the half area of the top of the negative photo-resist mold and being filled in the first groove 14 of the negative photo-resist mold (referring to FIG. 2(d)). After baking at 90° C. for 1 hour, the first PDMS film 17 was cured to act as a protection layer to prevent the forming of grating pattern on the narrower waveguide. After spin-coating a positive photo-resist (Ultra 123, MicroChem Corp., MA) on the negative photo-resist mold, a first gratings pattern is formed in the second groove 15 by using a two beam interference pattern holographically exposing on the positive photo-resist film, and is developed in a Ultra 123 developer. In order to peel off the protection layer (the first PDMS film 17), which is lapsed into the first groove 14 of the negative photo-resist mold 16, a second PDMS film 20 is spun on the negative photo-resist mold 16 and is followed by 90° C. baking for 1 hour so as to adhere the first PDMS film 17, and then, peeled off and remove the first and second PDMS film. At this stage, the first waveguide mold (the negative photo-resist mold 16) is accomplished (referring to FIGS. 3(a) to (c)). Referring to FIG. 7, the OM image shows the positive photo-resist filled into the groove of the wider waveguide after spin coating, the final cross-sectional dimensions are 6.8 µm×6 µm and 9.6 µm×5 µm, and the gap is about 2.1 µm.

Referring to FIGS. 3(c) to (g), the patterned negative photo-resist mold 16 was used as a mother mold to transfer the waveguide pattern onto a PDMS stamp mold 24 using typical micro-molding techniques (e.g. stamping). Instead of PDMS, resulting in a sticking effect in a high-aspect-ratio grating fabrication, a pre-cured third PDMS film 21 is injected into the second groove 15 (the grating-engraved waveguide groove) and covering the half area of the top of the negative photo-resist mold 16 by using the capillary effect, the techniques are as mentioned above. After baking at 90° C. for 1 hour, the third PDMS film 21 is cured, then a fourth PDMS film 23 is spinning coated on the top of the negative photo-resist mold 16 covering the third PDMS film and being filled in the first groove 14, and then the fourth PDMS film 23 is baking at 90° C. for 1 hour to adhere with the third MDMS film 21. Then remove the negative photo-resist mold 16 from the fourth PDMS film 23 and the third PDMS film 21, so that the composition of the fourth PDMS film 23 and the third MDMS film 21 to be a PDMS stamp mold 24. The PDMS stamp mold 24 has a first protruding strip 25 and a second protruding strip 26 with the shape matching with the first groove 14 and the second groove 15 respectively, and the second protruding strip 26 having the second gratings 22.

Figure 8:
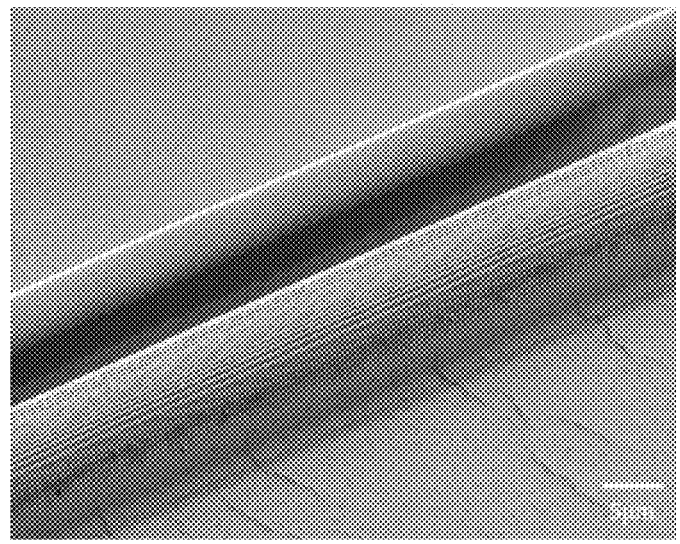
FIG. 8 is the SEM micrograph of the PDMS-hPDMS waveguide with grating; the SEM was titled about 30°.

Referring to FIG. 8, a SEM image of the PDMS stamp mold is taken after it is fabricated, showing the intact gratings on the waveguide coupler on the PDMS stamp mold. The grating period and depth are about 500 nm and 400-450 nm, respectively. These two quantities were measured using an atomic force microscope (AFM). The waveguides with a single grating pattern is transferred onto a first UV polymer (Ormo-comp, refractive index=1.505 @1550 nm, product of German company "micro resist technology, GmbH") from the PDMS stamp mold using UV replication process.

Figure 9:
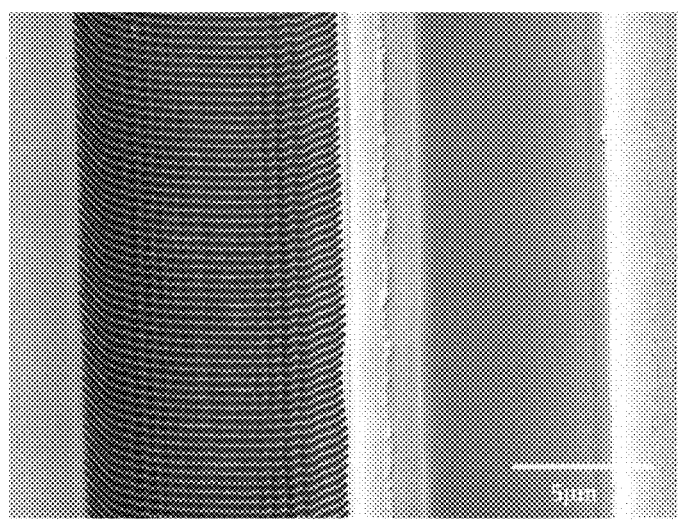
FIG. 9 is SEM micrograph of the UV epoxy groove showing the intact grating pattern inside the groove.

Referring to FIGS. 4(a) to (g), the first UV polymer (Ormo-comp) film 27 is deposited on a glass slide 37. In order to enhance the adherence between the first UV polymer film 27 and the glass slide 37, an adhesion promoter film 38 (prime 08), was deposited on a thin Pyrex glass slide 37. A spacer with a thickness of 30 µm was placed between the PDMS stamp mold 24 and the adhesion promoter film 38 deposited on the thin Pyrex glass slide 37. After injecting the pre-cured first UV polymer film 27 into the space between the adhesion promoter film 38 and the PDMS stamp mold 24, the epoxy (the pre-cured first UV polymer film 27) is then cured under a broadband UV light operating in a wavelength range of 300-400 nm. After the first UV polymer film 27 is completely cured, it is easily peeled off from the PDMS stamp mold 24, it is formed a third groove 28 and a fourth groove 29 by the first protruding strip 25 and the second protruding strip 26 respectively, and the bottom of the fourth groove 29 is formed third gratings 30 transferred by the second gratings 22 of the PDMS stamp mold 24, and after removing the PDMS stamp mold 24, the cured first UV polymer film 27 is to be a first cladding layer 31 of the ABC filter. Referring to FIG. 9, the SEM image shows that the replication on the first UV polymer is good, and matches the negative photo-resist mold dimension well. After separated from the PDMS stamp mold 24, a hardened epoxy with single grating is formed as the first cladding layer 31 of the polymer ABC waveguide filter. For the sample in FIG. 9, the cross-sectional dimensions of one waveguide groove (without grating) is 6 μm×6.9 μm and another waveguide groove (with grating) is 5 μm×9.7 μm, the gap between the two waveguide grooves is about 2.4 μm, the coupling length of the third gratings is about 15 mm, and the total length of the filter is about 5 cm.

In order to form the waveguide core, amount of second UV polymer (Ormo-core, refractive index=1.539@1550 nm, product of German company "micro resist technology, GmbH") is injected into the third and fourth grooves of the cladding layer. Instead of using the spin-coating technique, which could cause a thick unguided layer outside the core region, resulting in some coupling loss during the input of the optical fiber to the filter, another method of the present invention is proposed. A specific amount of pre-cured second UV polymer 32 is dripped into the third and fourth grooves 28/29 of the channel waveguides from an optical fiber, sharpened by using of a fusion splicing machine and suspended from a micro-positioning probing stage, under the inspection of a long-working-distance optical microscope. After the pre-cured second UV polymer 32 is fully filled into the third and fourth grooves 28/29, a PDMS layer 39 is spun on a glass slide 40 and placed over the top of the third and fourth grooves 28/29 (the waveguide grooves) to extrude the otiose epoxy outside the third and fourth grooves 28/29 (the core region) under a specific pressure; then, the pre-cured second UV polymer 32 (UV epoxy) is cured by exposure under the broadband UV light. After the cover glass slide 40 is removed, the PDMS layer 39 is peeled off from the sample (the first cladding layer 31), and the first cladding layer 31 having cores 33/34 in the third and fourth grooves 28/29 is obtained.

In order to prevent optical loss due to either surface scattering losses or the outright absence of a guided mode for the asymmetric waveguide structure, a second (upper) cladding layer 36 is used. A third UV polymer (Ormo-comp) film 35 is deposited on the first cladding layer 31 by using the procedure described in the previous section. A spacer with a thickness of 30 μm was placed between the first cladding layer 31 and a thin Pyrex glass slide (the spacer and the thin Pyrex glass slide are not shown in the figure). After injecting the pre-cured third UV polymer film 35 into the channel between the first cladding layer 31 and the thin Pyrex glass slide, and sealing the top opening of the third groove 28 and the fourth groove 29, the third UV polymer film 35 is exposed by UV light, so that the third UV polymer film 35 is cured as the second cladding layer 36 and cross-linking with the first cladding layer 31, and finally obtaining the ABC wavelength filter 41 having the second cladding layer 36, the waveguide cores 33/34 with different width, and the first cladding layer 31 receiving the waveguide cores 33/34 and the third gratings 30 pattern.

Figure 10:
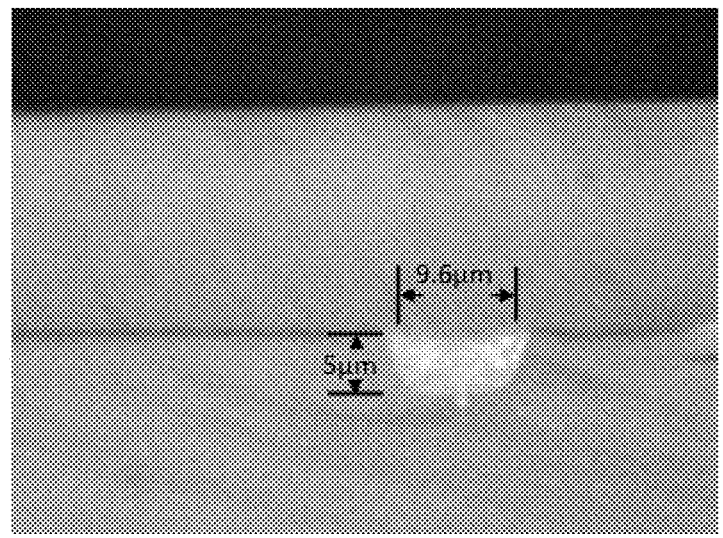
FIG. 10 is the optical-micrograph of the output end of the wider waveguide (cross-sectional dimension is 5 μm×9.6 μm) in accordance with the present invention.
Figure 11:
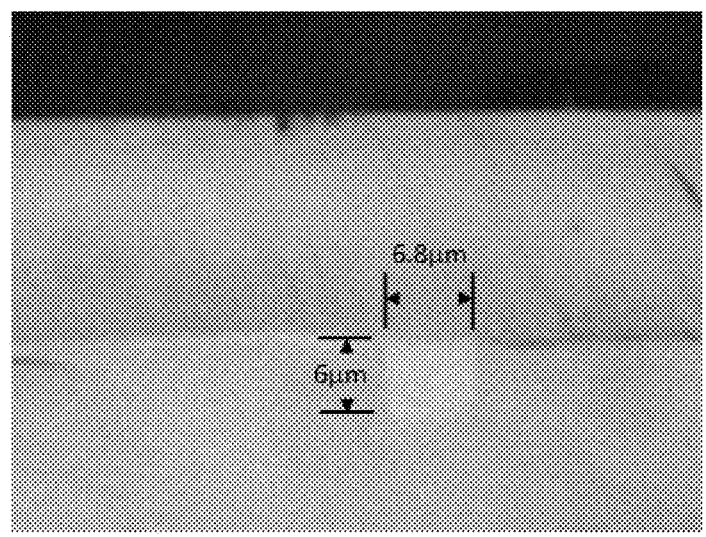
FIG. 11 is the optical-micrograph of the output end of the narrower waveguide (cross-sectional dimension is 6 μm×6.8 μm) in accordance with the present invention.

The sample is diced and the end-faces are polished, the final polymeric ABC filter is obtained with 4 cm in length, 1 cm in width and approximately 60 μm in thickness. FIGS. 10 and 11 show the cross-sectional view of the two asymmetric waveguides in the output end. Obviously, there is no unguided layer outside the core region. FIG. 10 shows the optical-micrograph of the output end of the wider waveguide (cross-sectional dimension is 5 μm×9.6 μm). FIG. 11 shows the optical-micrograph of the output end of the narrower waveguide (cross-sectional dimension is 6 μm×6.8 μm).

III. The Waveguide Properties of the Present Invention i. Simulation

Figure 12:
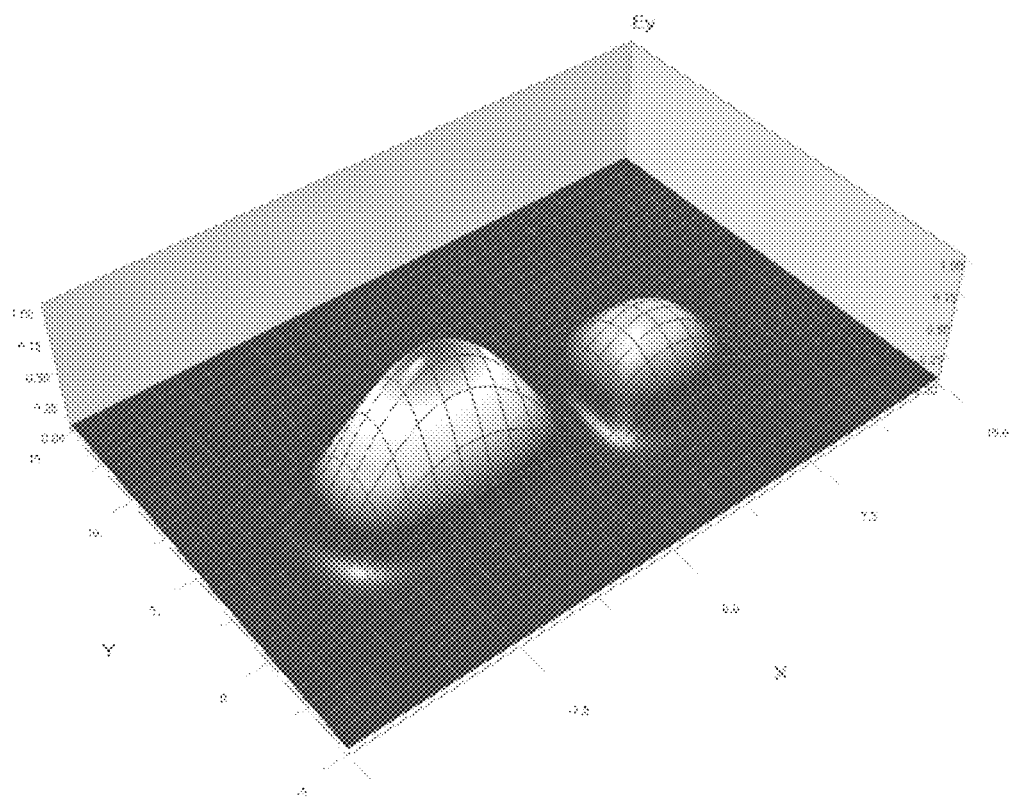
FIG. 12 is the first compound mode of the coupler structure in accordance with the present invention.
Figure 13:
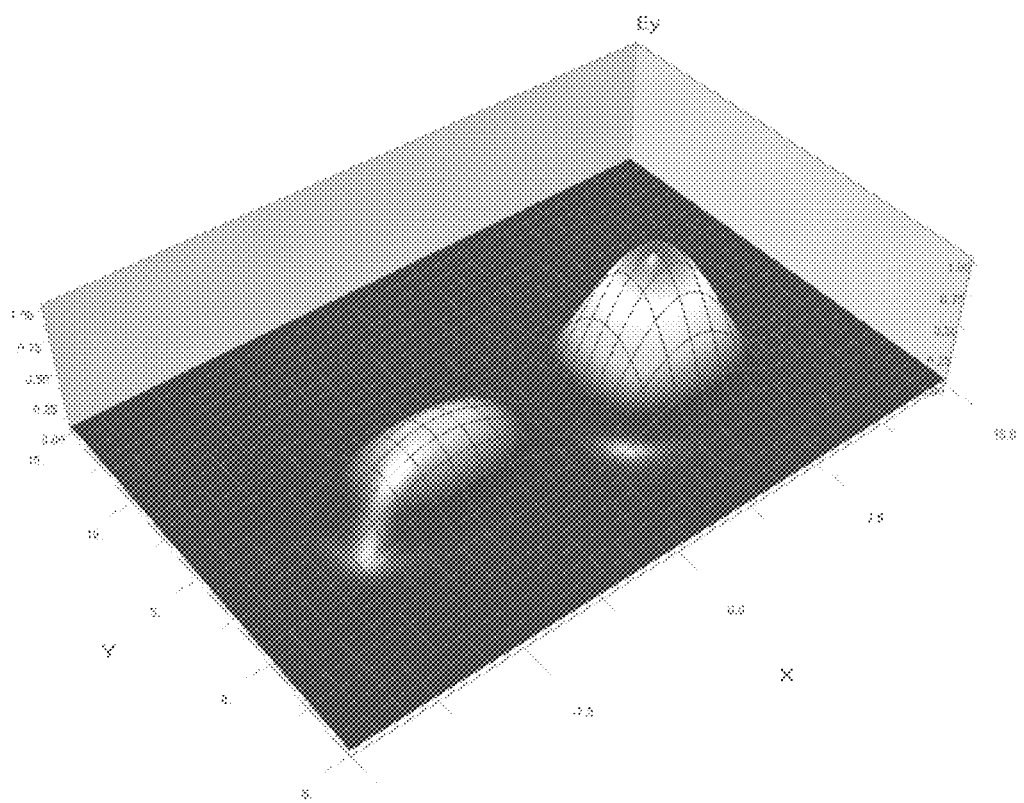
FIG. 13 is the second compound mode of the coupler structure (cross-sectional dimension are 4.5 μm×10 μm and 6 μm×7 μm gap s=2 μm) in accordance with the present invention.
Figure 14:
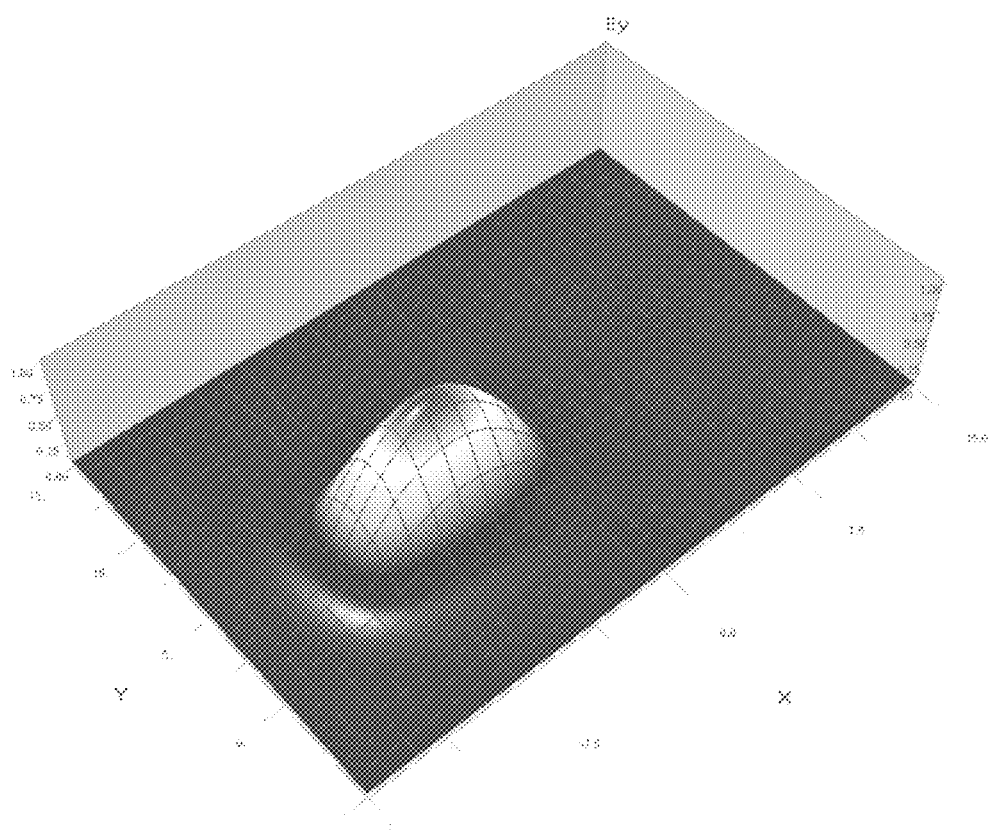
FIG. 14 is the fundamental mode of the single waveguide (width w=10 μm, depth d=4.5 μm) in accordance with the present invention.
Figure 15:
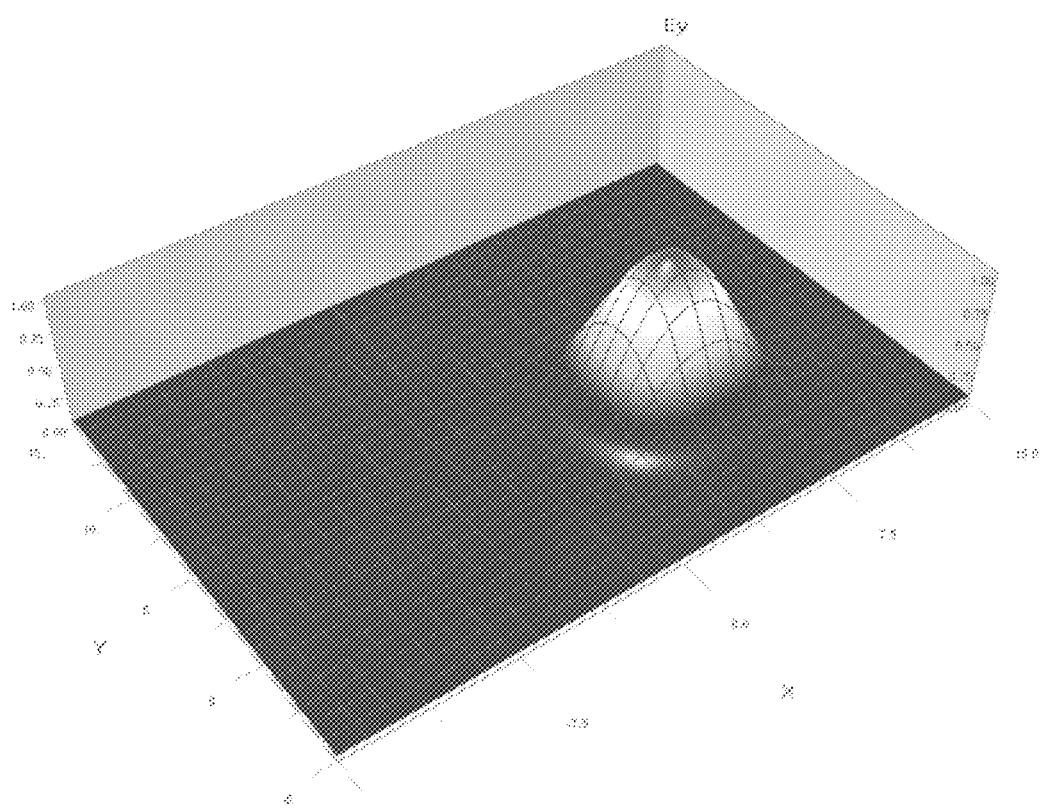
FIG. 15 is the fundamental mode of the single waveguide (width w=7 μm. depth d=6 μm) in accordance with the present invention.
Figure 16:
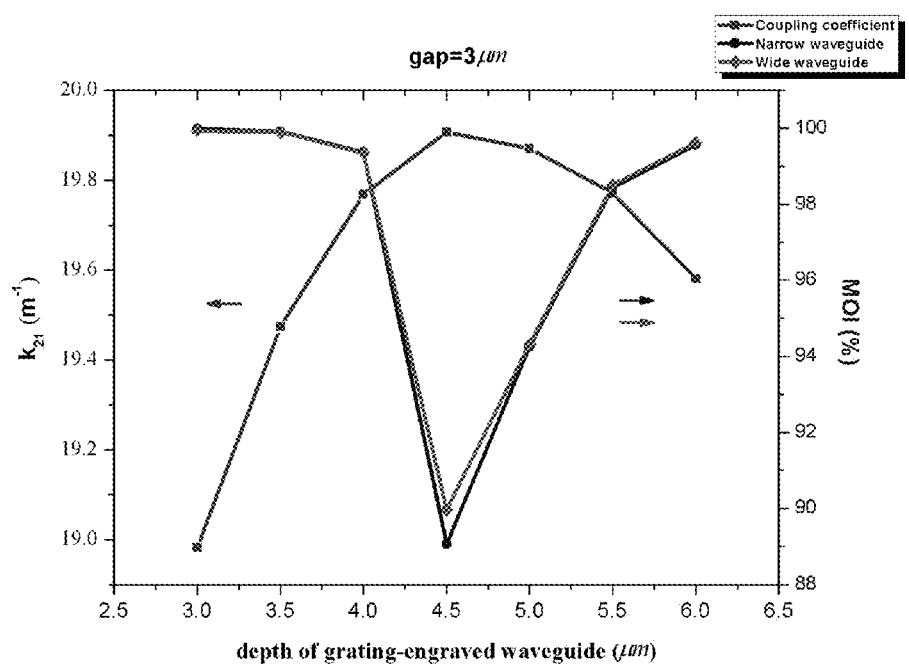
FIG. 16 is the diagram showing the coupling coefficient and the compound-individual mode overlap integrals vs. depth of grating-engraved waveguide (s=3 μm) in accordance with the present invention, and the waveguide widths are 10 μm for wide waveguide and 7 μm for narrow one.
Figure 17:
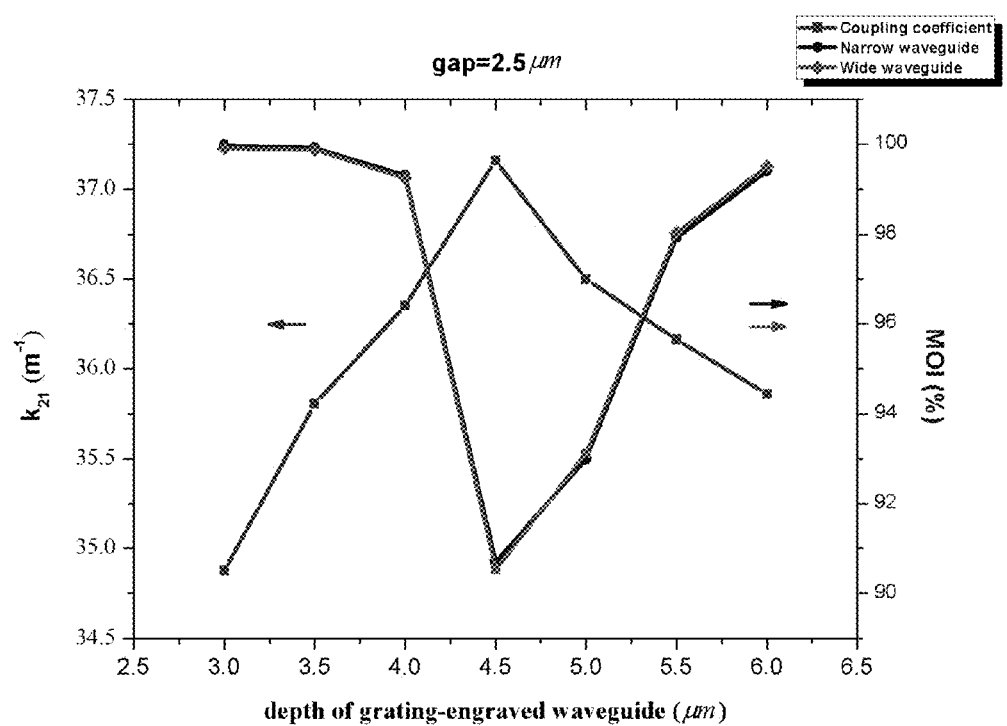
FIG. 17 is the diagram showing the coupling coefficient and the compound-individual mode overlap integrals vs. depth of grating-engraved waveguide (s=2.5 μm) in accordance with the present invention, and the waveguide widths are 10 μm for wide waveguide and 7 μm for narrow one.
Figure 18:
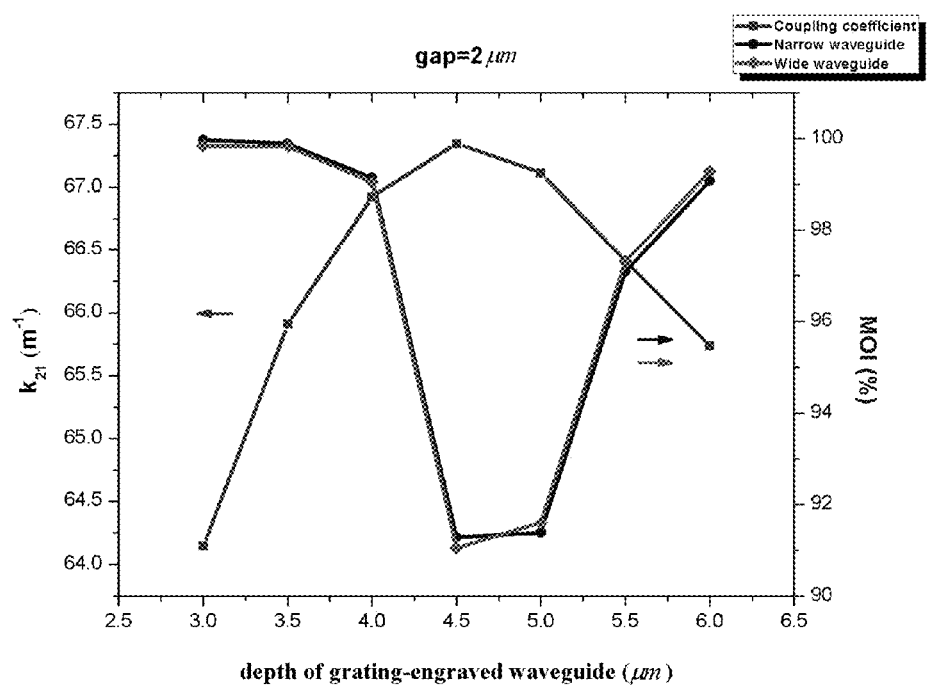
FIG. 18 is the diagram showing the coupling coefficient and the compound-individual mode overlap integrals vs. depth of grating-engraved waveguide (s=2 μm) in accordance with the present invention, and the waveguide widths are 10 μm for wide waveguide and 7 μm for narrow one.

The essential waveguide properties of the present invention, including the mode patterns and effective refractive indexes, were investigated using the finite different time domain beam propagation method (FDTD-BPM). The device transmission characteristics, including the minimum transmission and the bandwidth, were calculated from the coupled-mode equations. Because the depths of the grating-engraved waveguides vary with the thickness of positive photo-resist (Ultra-123) filled in the waveguide grooves of the negative photo-resist mold, the effects of depth variation on the transmission characteristics were analyzed as well in this work. In order to prevent co-directional evanescent coupling for obtaining excellent crosstalk performance, the inventor used highly asymmetric waveguides for the coupler to have compound modes confined to each single waveguide. For the ease of comparison, the cross-sectional dimensions of the narrow waveguides are fixed to 7 μm in width and 6 μm in depth, and the widths of the wide waveguides are fixed to 10 μm as well. The depths (denoted by d) of the wide waveguides and the separation gaps (denoted by s) of the two waveguides are ranged from 3-6 μm and 2-3 μm respectively. FIGS. 12 and 13 show the fundamental modes of the single waveguides, and FIGS. 14 and 15 show the compound modes of the ABC coupler filter with the condition of d=4.5 μm, and s=2 μm. The overlap integrals between the single and compound modes are 91.28% and 91.04% for the first and second modes respectively. It is noted that the overlap integral between the single and compound modes has a minimum as the depths of the grating-engraved waveguides reduced by 25% from the original depth, i.e. 6 μm (see FIGS. 16-18). The result implies that a maximum transmission loss, caused by co-directional cross power transfer, occurs at a depth difference of ¼ original depth between two waveguides. Nevertheless, as stated above, the configuration in our case possesses highly asymmetric property. The effective indices of the individual waveguides in the case of FIGS. 12 to 15 are 1.533054 and 1.532288, as obtained from the simulation.

As we known, the coupling coefficient $\kappa_{21}$, concerned with the drop reflectivity and the filtering bandwidth, are calculated from the waveguide mode patterns. Since the co-directional coupling is weak, the minimum transmission, $T_{min}$ in output port can be approximately obtained by $T_{min}=1-R_{max}$, where $R_{max}$ is the maximum drop reflectivity. It is found the coupling coefficient $\kappa_{21}$ changes with respect to the depths of the grating-engraved waveguides for different separation gaps (see FIGS. 16-18). Here, the depth and period of the grating are assumed to be 400 nm and 500 nm respectively. The results show there is a trade-off between the waveguide asymmetry and the coupling coefficient $\kappa_{21}$. The output transmission spectrum of the device (ABC filer of the present invention) with the condition of d=4.5 μm, s=2 μm, and coupling length L=15 mm, was depicted in FIG. 21.

ii. Measurement

Figure 19:
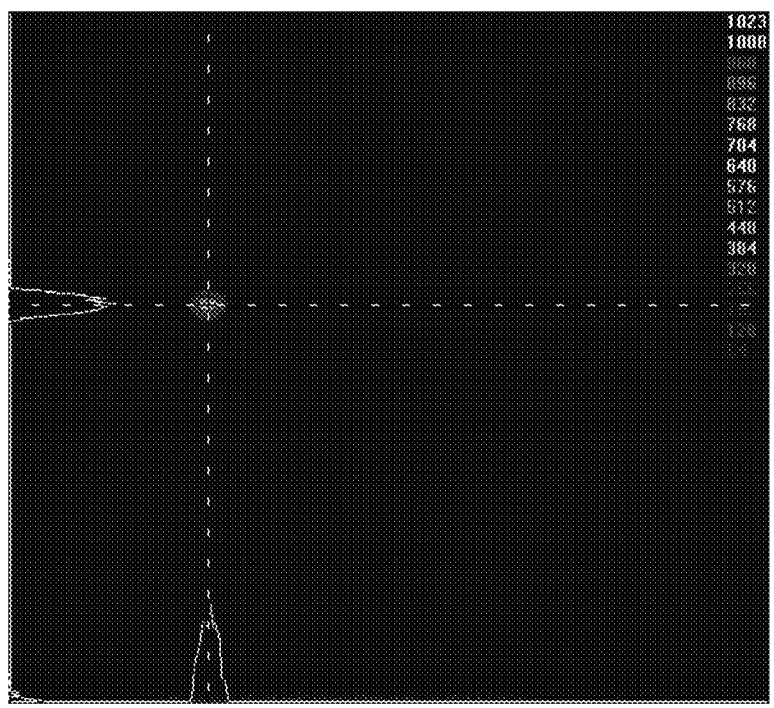
FIG. 19 is the diagram showing the transmission spectra of the ABC waveguide filter in accordance with the present invention; the solid line represents the experimental result and the dotted line represents the simulation result.
Figure 20:
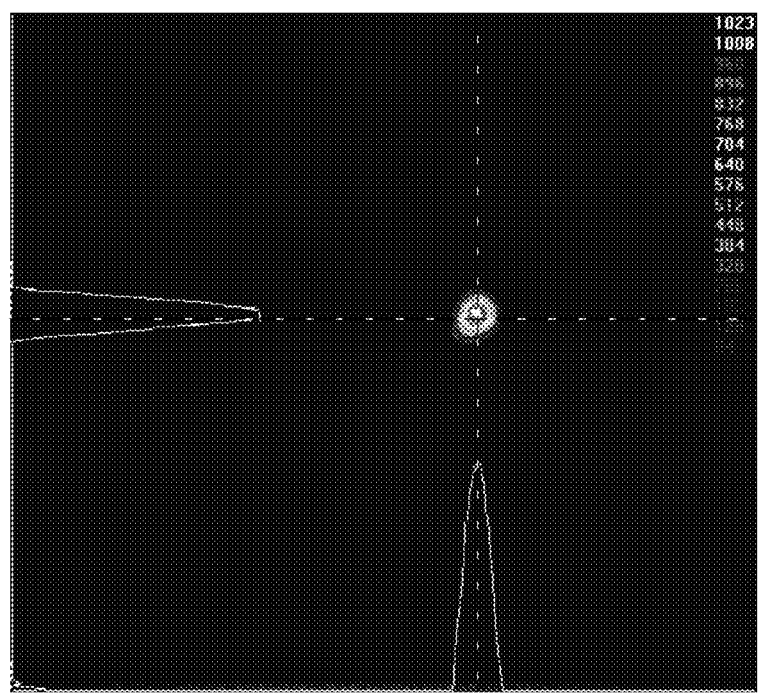
FIG. 20 is the diagram showing the near field intensity distribution of the wide waveguide (with grating) in accordance with the present invention.

The near-field patterns of the optical waveguides were observed using the end-fire coupling technique. The sample was fixed atop an x-y-z micro-positioner (product of USA company "Newport Inc."). A single mode optical fiber and microscope objective, used for input light coupling and output image magnification, were also mounted on micro-positioner to facilitate the critical alignment. An amplified spontaneous emission (ASE) source, emitting a wavelength range of 1530-1560 nm, was used as the wideband light source (Stabilized Light Source, PTS-BBS, Newport Inc., USA). The light source was polarized in the TE direction, using the in-line polarizer (ILP-55-N, Advanced Fiber Resources, China), which was followed by a polarization controller with an operation wavelength of around 1550 nm (F-POL-PC, product of USA company "Newport Inc."). The polarization state was examined by using near infrared precision linear polarizer (20LP-NIR, product of USA company "Newport Inc."). The output mode field of the waveguide of the present invention was imaged onto an IR-CCD (Model 7290, Micron Viewer, product of USA company "Electrophysics Inc.") with image analysis software (LBA-710PC-D, V4.17, product of USA company "Spiricon Inc.") to show the single-mode characteristics of the waveguide. FIGS. 19 and 20 show the field intensity distribution of the two output waveguides for the device of the ABC filter of the present invention (the cross sectional dimension are 4.5 µm×10 µm and 6 µm×7 µm, and gap s=2 µm). The ASE laser with power of 3 mW was shone onto the narrow waveguide end (without any gratings) to prevent self-reflection, and the asymmetric mode profile was observed as well.

In addition, the insertion, cross-talk, and polarization dependent loss were measured using the same system except that the IR-CCD was replaced by an IR power meter (918D-Ir-OD3 & Model 1918-C, product of USA company "Newport Inc."). The utilization of the wideband light source is to avoid optical interference problem. The insertion loss of about 2.5 dB and the cross-talk of about −12.8 dB were obtained for TE polarized light. The polarization dependent loss (PDL) was measured by polarization-scanning method and the result shows that the PDL is about 0.15 dB.

The spectral characteristics of the non-self-reflection ABC-based filter of the present invention were measured using a tunable laser system (Agilent 81640A, product of USA company "Agilent Inc."). The tunable laser is of a wavelength range of 1511-1562 nm and followed by a polarization controller. The output fiber of the tunable laser is of Panda-type polarization maintaining fiber, with TE mode in the slow axis in line with vertical direction. An alignment He—Ne laser, used as the auxiliary source, was combined with the wideband source using a 2×1 optical coupler. The optical filter was fixed atop a micro-positioner, two single-mode fibers used for input and output beam coupling which were also mounted on the micro-positioners. The input light source was polarized in the TE direction, as was the mode field measurement system. The output fiber was then connected to the receiver end of the tunable laser to characterize the filter performance.

Figure 21:
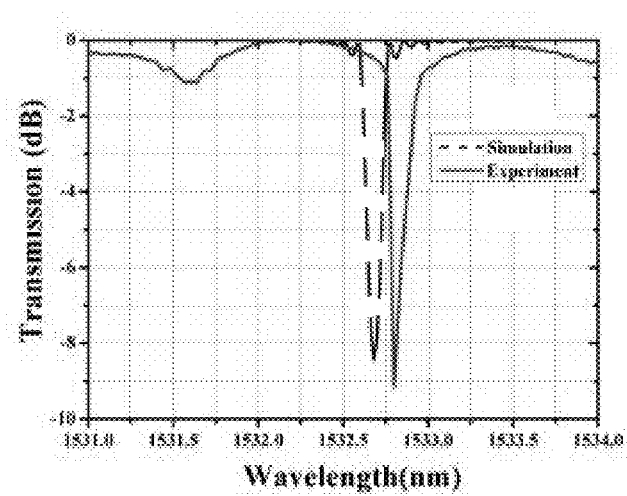
FIG. 21 is the diagram showing the near field intensity distribution of the narrow waveguide (without grating) in accordance with the present invention; the ASE laser with the power of 3 mW was shone onto the narrow waveguide.

To avoid undesired reflection for optimum device operation, the tunable laser was coupled onto the narrow waveguide ends of the filters and coupled out from the alternative ends of the same waveguides. The measured result which is similar to the theoretical prediction is depicted in FIG. 21. At the Bragg wavelength, a single transmission dip of −9.2 dB was obtained. The measured Bragg wavelength is about 1532.8 nm, which is off approximately 0.13 nm from the theoretical prediction (1532.67 nm). The 3 dB bandwidth of the filter measured is about 0.125 nm, different from the simulation one by 0.025 nm (the theoretical bandwidth is about 0.1 nm). Furthermore, there is a side lobe observed in experiment data at around 1531.6 nm, which might be caused from the Fabry-Perot etalon formed by the plane parallel faces of the fibers and waveguide. We also measured the filter response for TM polarization, which appears similar and almost overlaps with the TE polarization spectrum except for the transmission dip of −9.3 dB. According to the numerical simulation, the central wavelength is expected to be 1532.62 nm, which is shifted off the TE transmission dip merely by 0.05 nm, approaching the resolution of the tunable laser system.

IV. Conclusion

The inventor has successfully developed a process to fabricate a polymeric waveguide filter based on an asymmetric Bragg coupler with a single-grating waveguide. In the present invention, a master mold of an asymmetric waveguide coupler is formed first on a negative photo-resist mold, and is followed by injecting a first PDMS film into the narrow waveguide of the coupler to act as a protection layer. Then gratings pattern was exposed on the alternative waveguide and subsequently transferred to a PDMS stamp mold; following this step, the PDMS stamp mold is used as a stamp to transfer the ABC-based filter onto a UV cure epoxy to form the final filter. Simulation and experiment results demonstrate that the proposed fabrication process is reliable and accurate, which may offer great potential for mass production of grating structure on either waveguide of the waveguide couplers of the ABC filter.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A method for fabricating Asymmetric Bragg Coupler-based polymeric wavelength filters with single-grating waveguide comprising following steps:
   (A) depositing a negative photo-resist film on a glass substrate;
   (B) the negative photo-resist film being exposed by UV light through a photo mask to obtain a negative photo-resist mold having a first groove and a second groove, the widths of the two grooves being different from each other;
   (C) depositing a first PDMS film on the half area of the top of the negative photo-resist mold and being filled in the first groove of the negative photo-resist mold, and baking the first PDMS film;
   (D) depositing specific amount of positive photo-resist in the second groove;
   (E) holographically exposing the positive photo-resist to form first gratings on the bottom of the second groove;
   (F) depositing a second PDMS film on the top of the negative photo-resist mold to cover the first PDMS film and being filled in the second groove, and baking the second PDMS film;
   (G) removing the second PDMS film and the first PDMS film from the negative photo-resist mold;
   (H) depositing a third PDMS film on the half area of the top of the negative photo-resist mold and being filled in the second groove of the negative photo-resist mold, and baking the third PDMS film so as to have second gratings transferred by the first grating of the negative photo-resist mold;

(I) depositing a fourth PDMS film on the top of the negative photo-resist mold to cover the third PDMS film and being filled in the first groove, and baking the fourth PDMS film to adhere with the third MDMS film;

(J) removing the negative photo-resist mold from the fourth PDMS film and the third PDMS film, so that the composition of the fourth PDMS film and the third MDMS film being a PDMS stamp mold, the PDMS stamp mold having a first protruding strip and a second protruding strip with the shape matching with the first groove and the second groove respectively, and the second protruding strip having the second gratings;

(K) depositing the PDMS stamp mold on a first UV polymer film, so that the first UV polymer film being formed a third groove and a fourth groove by the first protruding strip and the second protruding strip respectively, and the bottom of the fourth groove being formed third gratings transferred by the second gratings of the PDMS stamp mold;

(L) curing the first UV polymer film by exposing UV light;

(M) removing the PDMS stamp mold, so that the cured first UV polymer film being a cladding layer of the wavelength filter;

(N) injecting a specific amount of second UV polymer into the third groove and the fourth groove, and exposing by UV light to form waveguide cores of the wavelength filter;

(O) depositing a third UV polymer film on the cladding layer to seal the top opening of the third groove and the fourth groove; and (P) exposing the third UV polymer film by UV light, so that the third UV polymer film being cured as second cladding layer and cross-linking with the first cladding layer, and finally obtaining the ABC wavelength filter having the second cladding layer, the waveguide cores with different width, and the first cladding layer receiving the waveguide cores and the gratings pattern.

2. The method as claimed in claim 1, wherein step (A), deposits a fourth UV polymer film on the substrate firstly, then deposits the negative photo-resist film on the fourth UV polymer film.

3. The method as claimed in claim 2, wherein the fourth UV polymer is OG 146 epoxy.

4. The method as claimed in claim 1, wherein step (A), the negative photo-resist film is coated with 6.0 μm thick by spinning at 1000 rpm for 17 seconds.

5. The method as claimed in claim 1, wherein step (C), (F), (H) and (I), the condition of the baking is at the temperature of 90° C. for 1 hour.

6. The method as claimed in claim 1, wherein the depth and period of the third gratings are 400 nm and 500 nm respectively.

7. The method as claimed in claim 1, wherein the refractive index of the first UV polymer and the third UV polymer at 1550 nm wavelength are 1.505 respectively, and the refractive index of the second UV polymer at 1550 nm wavelength are 1.539.

8. The method as claimed in claim 1, wherein step (M), the wavelength of the UV light is around 300-400 nm.

9. The method as claimed in claim 1, wherein the cross-sectional dimensions of the third groove without grating is 6 μm×6.9 μm and of the fourth groove with grating is 5 μm×9.7 μm, the gap between the third and fourth grooves is about 2.4 μm, the coupling length of the third gratings is about 15 mm, and the total length of the filter is about 5 cm.

10. The method as claimed in claim 1, wherein step (N), After the second UV polymer is fully filled into the third and fourth grooves, a PDMS layer is spun on a glass slide and placed over the top of the third and fourth grooves to extrude the otiose second UV polymer outside the third and fourth grooves under a specific pressure, and after the second UV polymer is cured, the glass slide is removed and the PDMS layer is peeled off from the first cladding layer.

11. The method as claimed in claim 1, wherein step (O), spacers is placed between the first cladding layer and a glass slide; the pre-cured third UV polymer is injected into the channel between the first cladding layer and the glass slide, and seals the top opening of the third groove and the fourth groove.

12. The method as claimed in claim 1, wherein step (O), the first UV polymer film is deposited on a glass slide, and an adhesion promoter film is deposited between the first UV polymer film and the glass slide.

* * * * *